United States Patent
Matsunawa et al.

[11] Patent Number: 5,357,354
[45] Date of Patent: Oct. 18, 1994

[54] COLOR IMAGE PROCESSING APPARATUS CAPABLE OF DISCRIMINATING BETWEEN A MONOCHROMATIC DOCUMENT AND A COLOR DOCUMENT

[75] Inventors: Masahiko Matsunawa, Ome; Seiichiro Hiratsuka, Hachioji; Koji Washio, Hachioji; Hiroshi Tokunaga, Hachioji; Tadao Kishimoto, Hachioji; Takashi Hasebe, Hachioji, all of Japan

[73] Assignee: Konica Corporation, Tokyo, Japan

[21] Appl. No.: 3,864

[22] Filed: Jan. 11, 1993

Related U.S. Application Data

[63] Continuation of Ser. No. 440,316, Nov. 22, 1989, abandoned.

[30] Foreign Application Priority Data

Nov. 26, 1988 [JP] Japan .................. 63-298966
Dec. 9, 1988 [JP] Japan .................. 63-311625
Dec. 9, 1988 [JP] Japan .................. 63-311626

[51] Int. Cl.$^5$ .............................. H04N 1/46
[52] U.S. Cl. ........................ 358/530; 358/518; 382/56
[58] Field of Search .............. 358/75, 80, 501, 502, 358/518, 530, 500; 382/17, 56; H04N 1/46

[56] References Cited

U.S. PATENT DOCUMENTS

| | | | |
|---|---|---|---|
| 4,739,397 | 4/1988 | Hayashi | 358/530 |
| 4,829,371 | 5/1989 | Hiramatsu et al. | 358/506 |
| 4,935,787 | 6/1990 | Maeda et al. | 355/326 |
| 4,953,013 | 8/1990 | Tsuji et al. | 358/530 |
| 4,979,031 | 12/1990 | Tsuboi et al. | 358/531 |

FOREIGN PATENT DOCUMENTS

| | | | |
|---|---|---|---|
| 0225100A2 | 6/1987 | European Pat. Off. | |
| 3041184A1 | 5/1981 | Fed. Rep. of Germany | |
| 0062680 | 3/1991 | Japan | H04N 1/46 |
| 3270382 | 12/1991 | Japan | H04N 1/46 |

OTHER PUBLICATIONS

Patent Abstracts of Japan, vol. 13, No. 496 (E-843) (3844), Nov. 9, 1989.

Primary Examiner—Reinhard J. Eisenzopf
Assistant Examiner—Jill Jackson
Attorney, Agent, or Firm—Finnegan, Henderson, Farabow, Garrett & Dunner

[57] ABSTRACT

An image processing apparatus for processing a digital color signal, given from outside the image processing apparatus, into a digital color recording signal, comprising; a color code generator for generating a color code signal representing a color of a digital pixel image signal, and a color reproduction unit for generating a color recording signal by processing another digital pixel image signal, in which these two digital pixel image signals are processed separately.

10 Claims, 13 Drawing Sheets

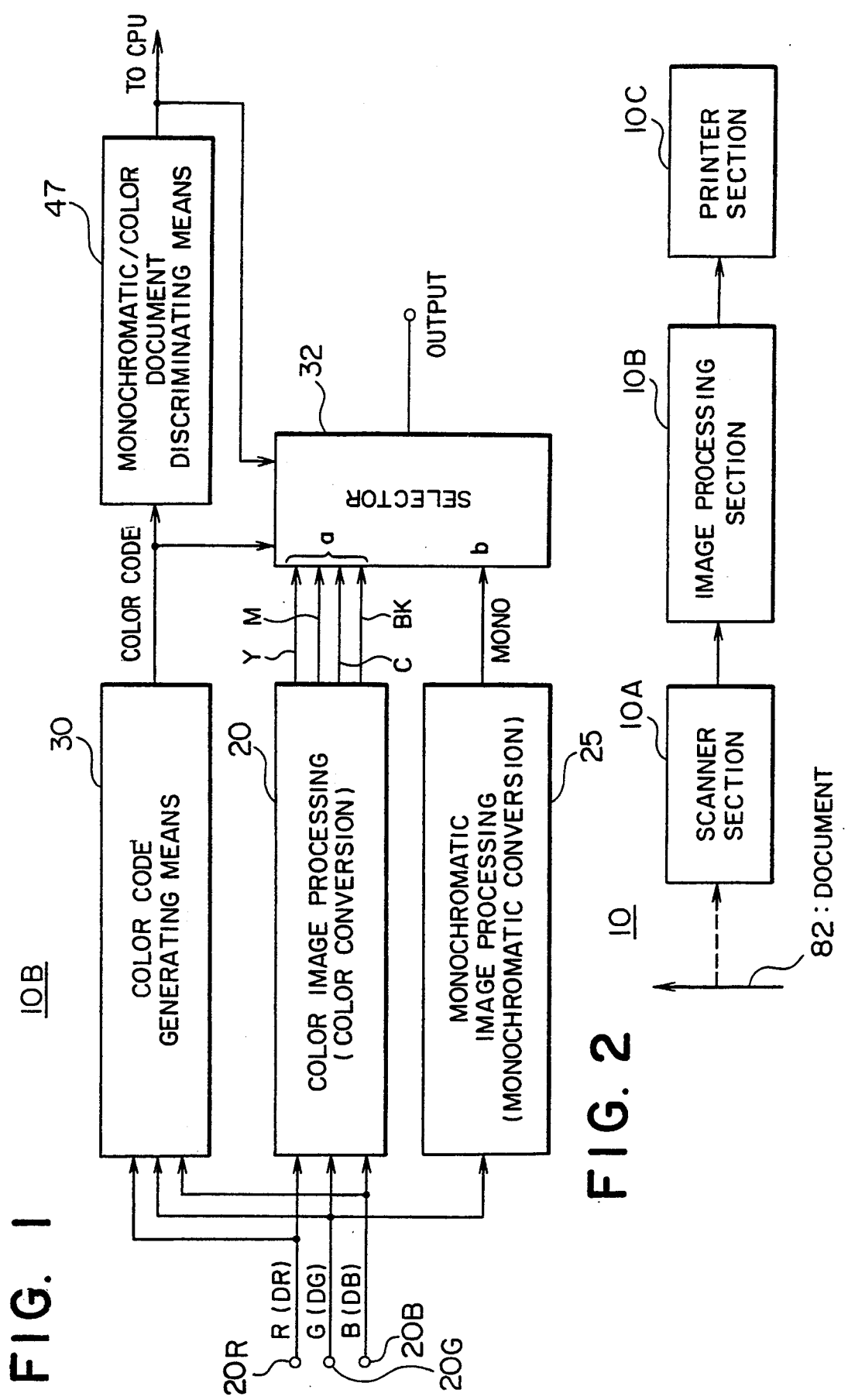

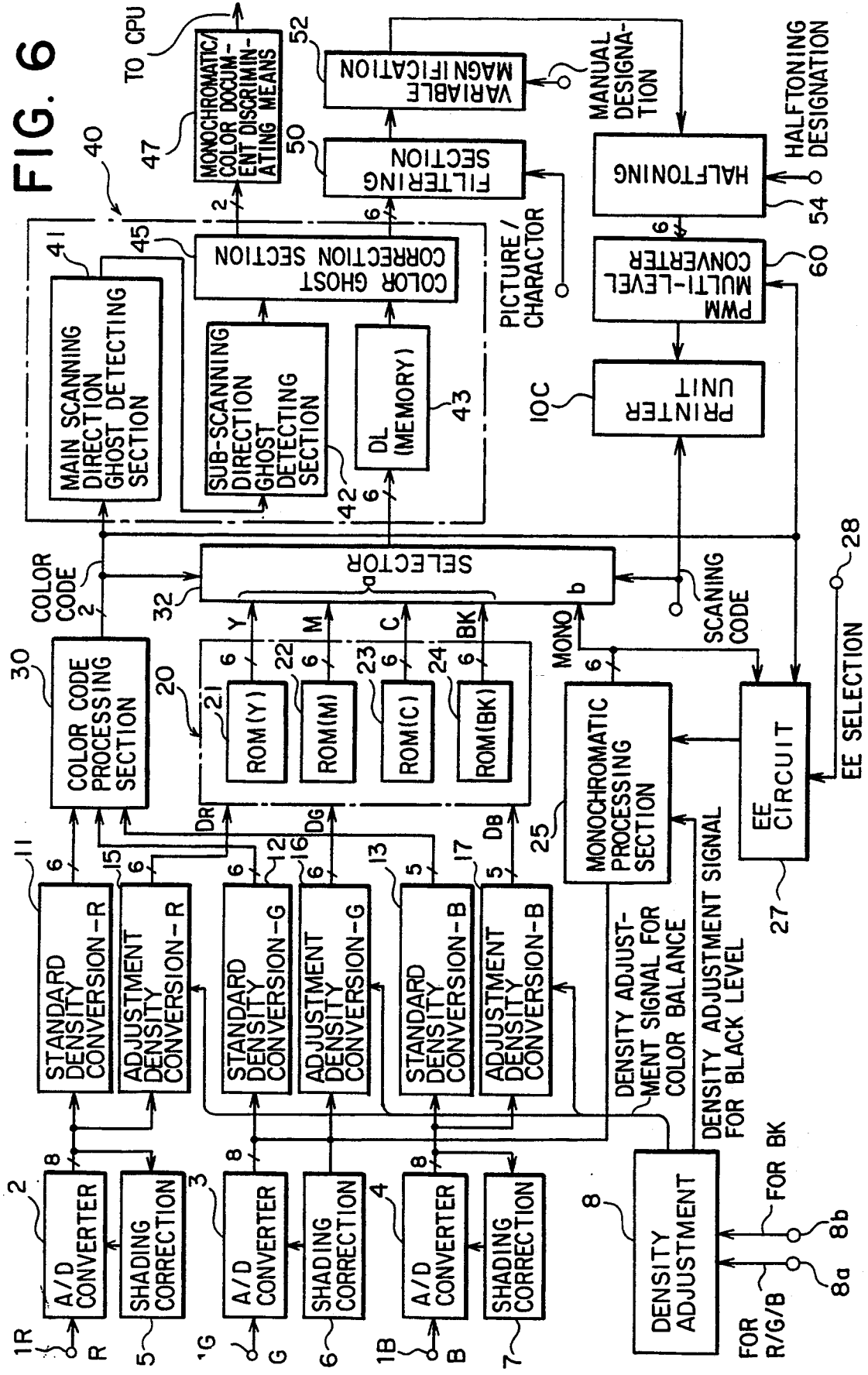

FIG. 11
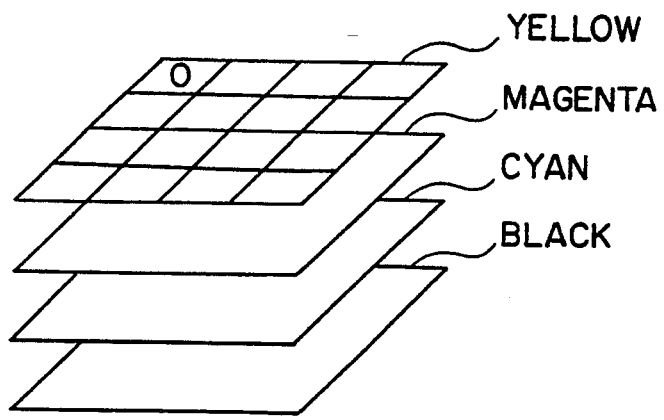
FIG. 12
| X1 Y1 Z1 | X2 Y2 Z2 | X3 Y3 Z3 | X4 Y4 Z4 |
| --- | --- | --- | --- |
| X5 Y5 Z5 | X6 Y6 Z6 | X7 Y7 Z7 | X8 Y8 Z8 |
| X9 Y9 Z9 | X10 Y10 Z10 | X11 Y11 Z11 | X12 Y12 Z12 |
| X13 Y13 Z13 | X14 Y14 Z14 | X15 Y15 Z15 | X16 Y16 Z16 |
FIG. 13
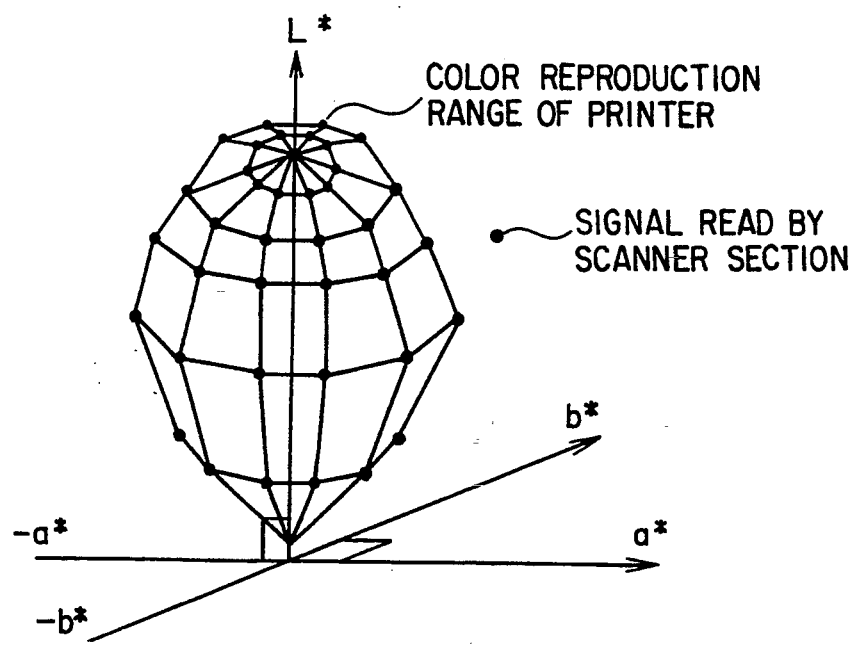

| SCANNING CODE | Y | | M | | C | | BK | |
|---|---|---|---|---|---|---|---|---|
| COLOR CODE | 10 CHROMATIC COLOR | 00,11 ACHROMATIC COLOR | 10 CHROMATIC COLOR | 00,11 ACHROMATIC COLOR | 10 CHROMATIC COLOR | 00,11 ACHROMATIC COLOR | 10 CHROMATIC COLOR | 00,11 ACHROMATIC COLOR |
| SELECTOR OPERATION | OUTPUT Y | OFF | OUTPUT M | OFF | OUTPUT C | OFF | OUTPUT BK | OUTPUT MONO |

OFF : NO OUTPUT

FIG. 16
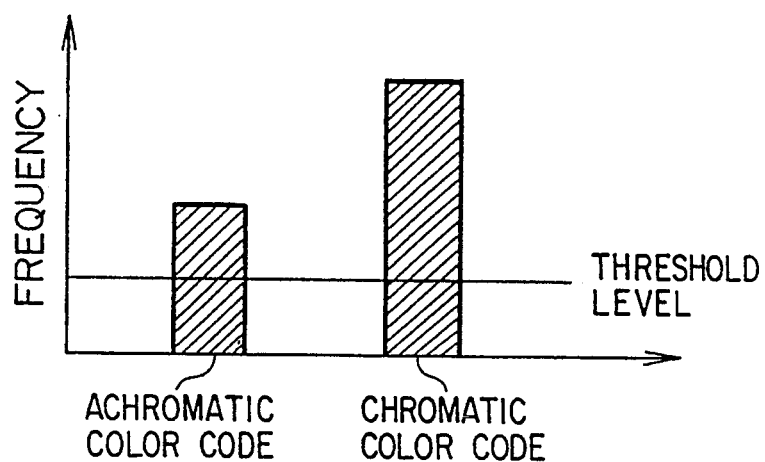
FIG. 17
| ACHROMATIC COLOR | CHROMATIC COLOR | DISCRIMINATION |
|---|---|---|
| HIGH | LOW | MONOCHROMATIC |
| HIGH | HIGH | COLOR |
| LOW | LOW | MONOCHROMATIC |
| LOW | HIGH | COLOR |
FIG. 18A
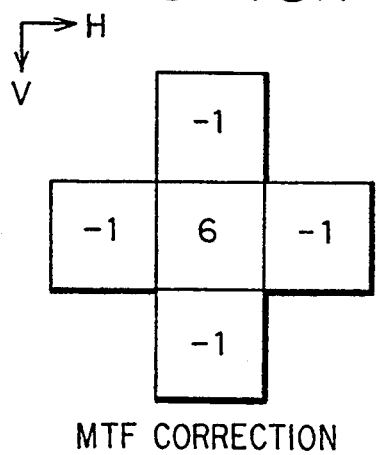
MTF CORRECTION
FIG. 18B
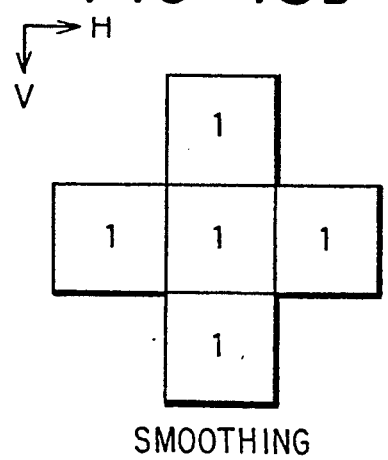
SMOOTHING

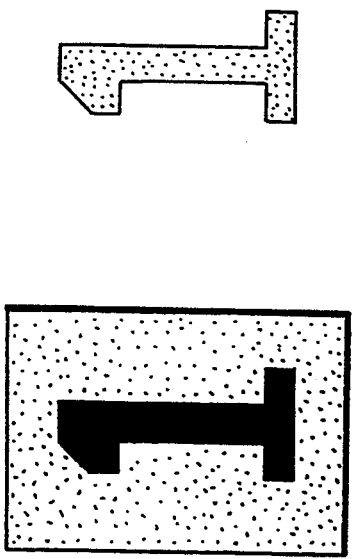
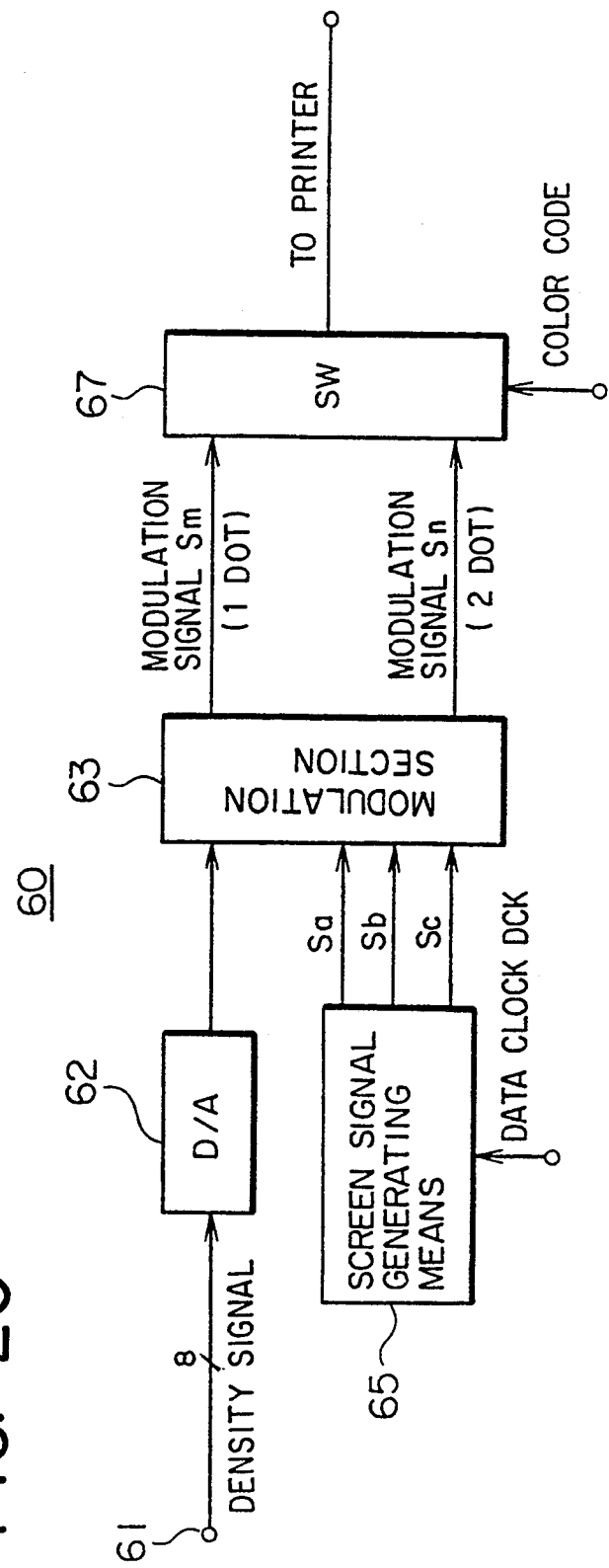
FIG. 19A  FIG. 19B
FIG. 20

COLOR IMAGE PROCESSING APPARATUS CAPABLE OF DISCRIMINATING BETWEEN A MONOCHROMATIC DOCUMENT AND A COLOR DOCUMENT

This application is a continuation of application Ser. No. 07/440,316 filed Nov. 22, 1989, now abandoned.

BACKGROUND OF THE INVENTION

This invention relates to a color image processing apparatus which is suited for a photoelectric digital color copying apparatus which allows for full color copying, especially to a color image processing apparatus which controls the image forming processes by discriminating between a monochromatic document containing mostly black characters and a color document and provides outstanding color reproducibility and color balance adjustment operability.

Most photoelectric digital color copying apparatuses which allow for full color copying are configured to use a plurality of image forming processes for obtaining desired color copies.

When reproducing, for example, a desired color document using three colors as color copying developers, yellow Y, Magenta M, and cyan C, or the three colors plus black BK, the target color document can be copied by repeating the image forming process three or four times at most to superpose the developers.

When a color image processing apparatus which uses the superposition method for copying a color document is to be used, the image forming process repeat count should be controlled according to the color document.

When only one of Y, M, and C is to be used for copying a color document, the color image can be developed using one developer, which allows the image forming process to be performed once. For copying another chromatic color or monochromatic color documents, the image forming process should be repeated as many as the number of necessary target colors.

For such a color image processing apparatus, therefore, it is an extremely important problem to detect the color information of a color document. It is comparatively simple to configure a color information discriminating means by increasing the circuit scale for accurately detecting a color document. However, this method causes an increase in cost and difficulties in miniaturizing the circuit substrate.

The present invention provides a color image processing apparatus which can definitely discriminate the color information of a color document without increasing the circuit scale in view of those problems.

In some of such color image processing apparatuses, the density adjustment is performed for each of R, G, and B as a color balance adjustment. For such a density adjustment, the color density of each of R, G, and B is increased or decreased.

When the color balance adjustment of such an apparatus is performed by increasing or decreasing one of the colors R, G, and B, portions, an original colored black may be colored differently and achromatic portions such as black characters may be colored with a chromatic color.

In view of the above problems, an object of the present invention is to realize a color image processing apparatus that prevents achromatic portions from being colored by the color balance adjustment. In such a color image processing apparatus, the color balance adjustment is generally performed in the progression where the color signals are in the form of Y, M, C, and BK just prior to turn out the signals to an image output apparatus (printer).

FIG. 24 shows a schematic diagram of such a color image processing apparatus. In the figure, numeral 1 designates a scanner unit which optically reads a document image and outputs digital data for each of R, G, and B. Numeral 2 designates a color reproduction section which converts the read R, G, and B data to Y, M, C, and BK, which are recording toner colors, data. Numeral 3 designates a color balance adjusting section which performs a density adjustment for the Y, M, C, and BK data for each color as a color balance adjustment. Numeral 4 designates a printer unit which forms an image according to the color-balance adjusted Y, M, C, and BK data. For the color balance adjustment of such a color image processing apparatus, the density is increased or decreased for each of the colors Y, M, C, and BK.

There is a problem imposed by the color balance adjustment of such an apparatus that it is difficult for the operator to have a sense of color balance adjustment because the read R, G, and B data do not have a one-to-one correspondence with the outputted Y, M, C, and BK data. There is another problem that, since the gradation characteristics of each of the colors Y, M, C, and BK outputted by the printer are not uniform and the characteristics are complicated, the adjustment cannot be performed easily, In view of the above problems, another object of the present invention is to realize a color image processing apparatus which allows for easy color balance adjustment.

SUMMARY OF THE INVENTION

To solve the above problems, in the color image processing apparatus of the present invention which reproduces a color document by repeating a plurality of image forming processes.

Whether the document is a monochromatic document or a color document is discriminated on the basis of the information identifying white, an achromatic color, and chromatic colors provided for each picture element, and the image forming processes are controlled on the basis of the discriminated result.

From the color code generating means, therefore, coded signals (color code data) corresponding to the chromatic colors, achromatic color, and white are outputted for each picture element.

The color code data is outputted to the monochromatic/chromatic color discriminating means, and whether the document is a monochromatic document or a chromatic document is discriminated.

The present invention also realized the color image processing apparatus, which converts a digital color signal, outputted from outside the apparatus, to a digital recording color signal for image processing, comprising color code generating means for generating a color code indicating the color type of the digital color signal and color reproducing means for converting the digital color signal to a digital recording color signal by correcting the color. The apparatus is structured so that a digital color signal outputted to the color code generating means differs from a digital color signal outputted to the color reproducing means. The color code indicating the color type is constant even when the digital color signal outputted to the color reproducing means is adjusted, and the achromatic color can be reproduced satisfactorily.

Moreover, the present invention realized the color image processing apparatus comprising color balance adjusting means for adjusting the color balance of a digital color signal outputted from the outside and color reproducing means for converting the digital color signal, which is adjusted in color balance by the color balance adjusting means, to plural digital recording color signals corresponding to the colors of the color image forming toners, The digital color signals are adjusted in color balance by the color balance adjusting means before said signal is corrected in color.

BRIEF DESCRIPTION OF THE DRAWINGS

FIG. 1 is an entire apparatus block diagram for explaining a color image processing apparatus of the present invention, FIG. 2 is a schematic view of the color image processing apparatus, FIG. 6 is a schematic view indicating an example of the circuit system of the color image processing apparatus, FIGS. 11 and 12 are illustrations for the matrixes, FIG. 13 is an illustration for the color reproduction status, FIG. 16 is an illustration for, the histogram of code corresponding to density, FIG. 17 shows the relationship between image content and discriminated result, FIG. 18A, 18B are illustrations for the filtering processing, FIG. 19A shows the example halftoning of the outside of the image information, FIG. 19B shows the example halftoning of the inside of the image information, FIG. 20 is a schematic view of the PWM modulation circuit.

DETAILED DESCRIPTION OF THE INVENTION

Detailed descriptions of an example of a color image processing apparatus of the present invention which is applied to a photoelectric digital color copying apparatus mentioned above follow with reference to FIG. 1 and the following drawings.

In the image processing system of this example, as mentioned above, a color document is reproduced by four colors of Y, M, C, and BK, and the black characters of a document, especially of a monochromatic document, are reproduced by using dedicated black BK.

The reason for using dedicated black BK for reproducing black characters is to prevent the black density from being thinned.

Reproduction of black characters with dedicated black BK has an advantage that, when a document contains both a color image (color document) such as a color picture image and a monochromatic image (monochromatic document) such as black characters, the color image can be reproduced correctly as a color image and the monochromatic image as a monochromatic image.

FIG. 2 is a schematic view of the color image processing apparatus 10 of the present invention, which comprises a scanner section 10A, an image processing section 10B, and a printer section 10C.

The scanner section 10A is a series of processing systems up to conversion of an optical image, for the image information of a document obtained by optical scanning, to an electrical signal. This electrical signal is an image signal (analog signal) of the three primary colors R, G, and B in this example.

The printer section 10C is a processing system for recording image signals [pulse-width modulated (PWM) or multi-leveled outputs, which correspond to Y, M, C, and BK], outputted from the image processing section 10B, as visible images.

The printer section 10C in this example uses a photoelectric recording method using an image forming unit (a photosensitive drum), and a semiconductor laser beam is used as a light source for forming eletrostatic latent images. Therefore, the printer section 10C is configured as photoelectric laser printer.

Figure 3:
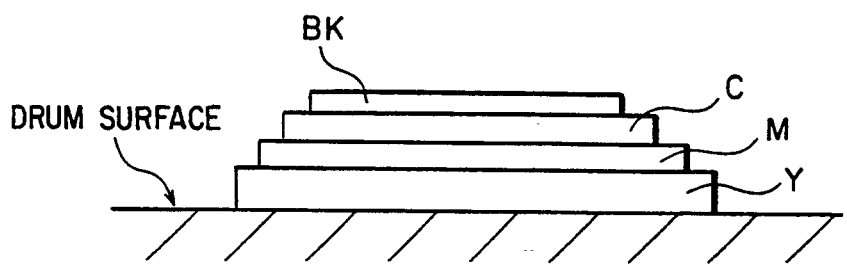
FIG. 3 is an illustration for the color superposition processing.

As shown in FIG. 3, developers (toners) for the colors Y, M, C, and BK are superposed on the image forming unit to reproduce a predetermined color. In this example, therefore, no transfer drum is used.

The image processing section 10B is a processing section for performing appropriate image processing, such as the variable magnification processing, filtering processing, half toning processing, PWM processing, and/or color ghost processing, for inputted image signals.

The image processing section 10B is also equipped with an image processing system (a color conversion processing system) for converting inputted image signals to image signals suited for outputting to the printer section 10C, which will be described later, besides the above processing. This color conversion processing system is an important part of the present invention. The color conversion processing system 10B comprises, as shown in FIG. 1, color image processing means 20, monochromatic image processing means 25, color code generating means (achromatic color discriminating means) 30, a selector 32, and monochromatic document/color document discriminating means 47.

The selector 32 is controlled on the basis of discrimination outputs from the color code generating means 30 and the monochromatic document/color document discriminating means 47, and color images or monochromatic images are selected by the selector 32.

For the color image processing means 20, an example that three colors R, G, and B are converted to four colors Y, M, C, and BK is provided. Four colors Y, M, C, and BK are selected to be matched with the colors (color tones) of the output system of the printer section 10C. The monochromatic image processing means 25 is supplied with a G signal as a luminance level signal of the color document.

Color code data relating to chromatic, white, or achromatic colors is outputted from the color code generating means 30 and supplied to the discriminating means 47 directly or indirectly.

The discriminating means 47 discriminates whether the document is a color document or a monochromatic document on the basis of the inputted color code data. The discrimination output is supplied to a CPU (not shown in the figure) which controls the apparatus so as to control the image forming process. Details will be described later.

Figure 4:
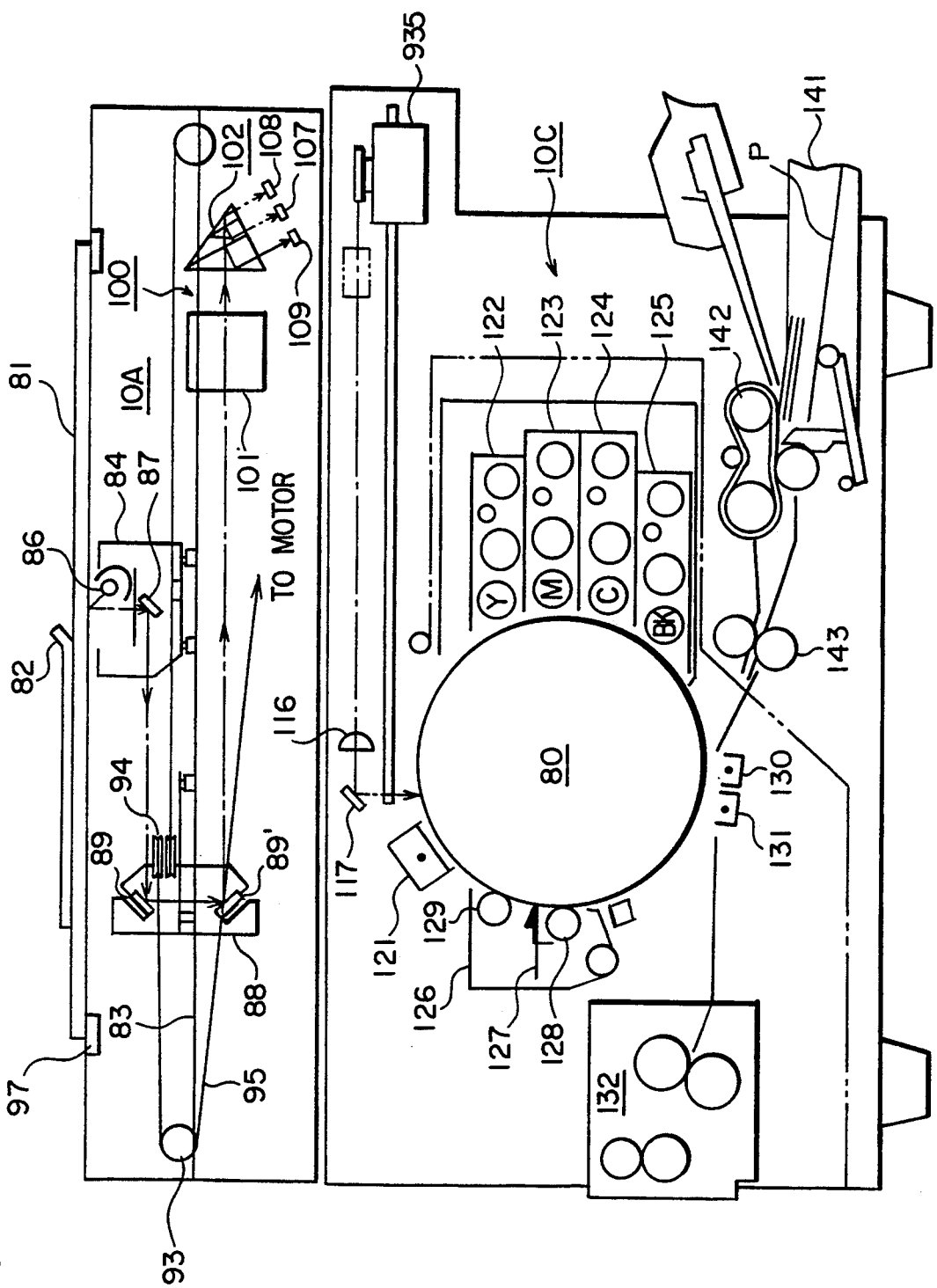
FIG. 4 is a schematic view indicating an example of the mechanism of a digital color copying apparatus.

FIG. 4 shows an example of the mechanism of a digital color copying apparatus configured as mentioned above.

Firstly, the scanner section 10A will be described hereunder. The scanner section 10A (a document reading section) is driven by turning on the copy button of the color copying apparatus.

A document 82 on a document table 81 is optically scanned by an optical system.

The optical system comprises a carriage 84 comprising a halogen lamp (or a fluorescent lamp) 86 and a reflecting mirror 87 and a movable mirror unit 88 comprising V mirrors 89 and 89'.

The carriage 84 and the movable unit 88 travel on a slide rail 83 by stepping motors (not shown in the figure) at a predetermined speed and in a predetermined direction respectively. Numerals 92 and 93 designate rollers and numeral 95 designates a belt.

When a halogen lamp is to be used as a light source, an IR cut filter is installed in front of the lens.

For optical scanning on a color document, commercial warm white fluorescent lamps may be used as light sources 86 to prevent a specific color from being emphasized or attenuated.

In this case, the fluorescent lamp 86 of those kinds is turned on and driven by a high frequency power source of about 40 KHz to prevent flickering, and insulated by a heater so as to keep the tube wall temperature constant or to accelerate its warming up.

The optical information (image information) obtained by illumination of the document 82 by the halogen lamp 86 is supplied to an optical information conversion unit 100 via the reflecting mirror 87 and the V mirrors 89 and 89'.

A standard white plate 97 is installed at the left end of the platen glass 81. An image signal (a white signal) can be normalized to a reference white signal (a reference signal) by optically scanning the standard white plate 97.

Figure 5:
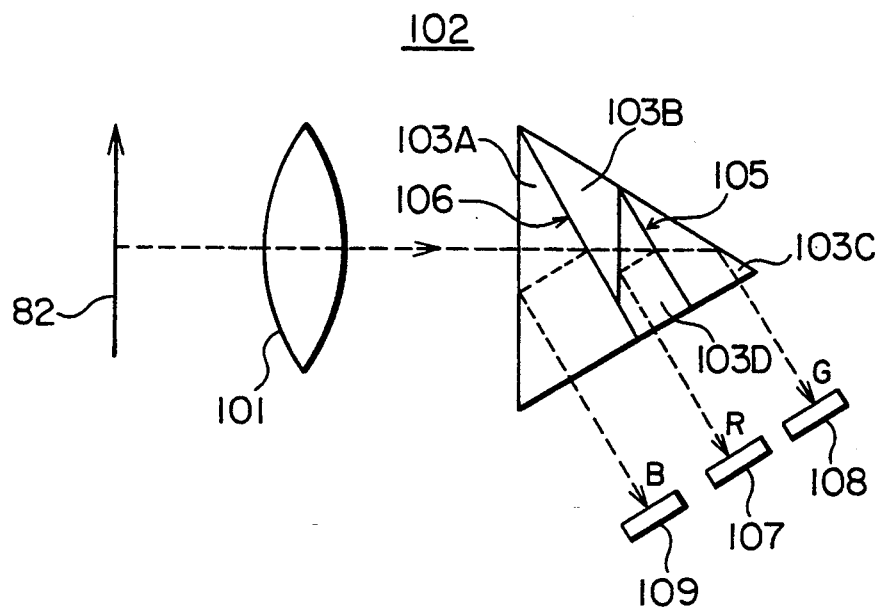
FIG. 5 is a schematic view of the spectral system.

The optical information conversion unit 100 comprises a lens 101 and a spectral system 102. The spectral system 102 comprises, as shown in FIG. 5, four prisms 103A to 103D and two dichroic coatings 105 and 106.

The dichroic coating 105 reflects red (R) and the dichroic coating 106 blue (B). The reflected lights or color separated images are focused into images on the corresponding optical sensors, CCD 107 to 109 in this example. The color separated images are converted to electrical signals (image signals) by CCD 107 to 109 respectively.

The printer section 10C is equipped with a deflecting system 935. The deflecting system 935 may be a deflecting system comprising light polarizers using crystal instead of a galvanomirror or rotational polygon mirror.

A laser beam modulated by a color signal is deflection-scanned by the deflecting system 935, and the deflected laser beam is focused into an image on the image forming unit 80 via a lens 116 and a mirror 117.

When the deflection scanning starts, the beam scanning is detected by a laser beam index sensor (not shown in the figure), and a beam modulation is started by the 1st color signal (for example, a Y signal).

The color of the 1st color signal and the colors of the 2nd to 4th color signals depend on the contents of a 3-bit digital signal outputted from the control unit of the apparatus which is called a scanning code.

The laser beam draws an image on the image forming unit (a photosensitive drum) 80 which is uniformly charged by a charger 121.

By the main scanning by the laser beam and the sub-scanning by rotation of the image forming unit 80, an electrostatic latent image corresponding to the Y signal is formed on the image forming unit 80.

This electrostatic latent image is developed by a developing machine 122 containing a yellow toner. The developing machine 122 is applied with a predetermined bias voltage from the high voltage power source. A yellow toner image is formed by development.

A toner is supplied to the developing machine 122 by controlling toner supply means (not shown in the figure), when necessary, on the basis of an instruction signal from a system control CPU (not shown in the figure).

The yellow toner image is rotated with the pressure of a cleaning blade 127 released, and an electrostatic latent image is superposed on the yellow toner image by the 2nd color signal (for example, a M signal) in the same way as with the 1st color signal. Using a Magenta toner contained in a developing machine 123, a Magenta toner image is developed.

The image forming processes such as the electrostatic latent processing and the development processing are executed in the order of cyan and black, and a desired multi-color toner image is formed on the image forming unit 80 (see FIG. 3). Numeral 124 designates a cyan developing machine and numeral 125 a black developing machine.

A monochromatic image can be formed on the image forming unit by one development processing. When a chromatic image and a monochromatic image coexist, the color image consisting of these images can be reproduced by 4 times of development processing.

In this case, the black color of the color image is reproduced by using Y, M, C, and BK. However, the black color of a monochromatic image is reproduced by using only BK.

For the development processing, the so-called non-contact 2-component jumping development can be used, wherein toner flies to the image forming unit 80 for development by being applied the DC voltage with AC bias voltage from the high voltage power source.

Recording paper P fed from a paper feeder 141 via a delivery roller 142 and a timing roller 143 is conveyed onto the surface of the image forming unit 80 in exact timing with the rotation of the image forming unit 80. A multi-color toner image is transferred onto the recording paper by using a transfer pole 130, through which a high voltage from the high voltage power source is applied to the recording paper, and the recording paper is separated from the photosensitive drum by using a separation pole 131.

The separated recording paper P is conveyed to a fixing machine 132. A color image is obtained through the fixation processing.

After the transfer, the image forming unit 80 is cleaned by a cleaning unit 126, and waits for the next image forming process.

In the cleaning unit 126, a metal roller 128 mounted to the blade 127 is applied with a predetermined DC voltage for easy collection of toners removed by the blade 127. The metal roller 128 is installed in non-contact with the surface of the image forming unit 80.

After cleaning, the blade 127 is released from the pressing state. To remove unnecessary remaining toners, an auxiliary cleaning roller 129 is installed. By turning and pressing the roller 129 in the direction opposite to that of the image forming unit 80, unnecessary toners can be fully cleaned and removed.

FIG. 6 shows a concrete example of the circuit layout of the image processing apparatus 10 of the present invention. Therefore, the figure is a detail drawing of the image processing section 10B.

Image signals R, G, and B outputted from CCD 107 to 109 are supplied to A-D converters 2, 3, and 4 via input terminals 1R, 1G, and 1B; and the image signals are converted to digital signals, which are a predetermined number of bits (8 bits in this example) long. Said image signals are corrected in shading simultaneously with A-D conversion. Numerals 5, 6, and 7 designate shading correction circuits.

Figure 7:
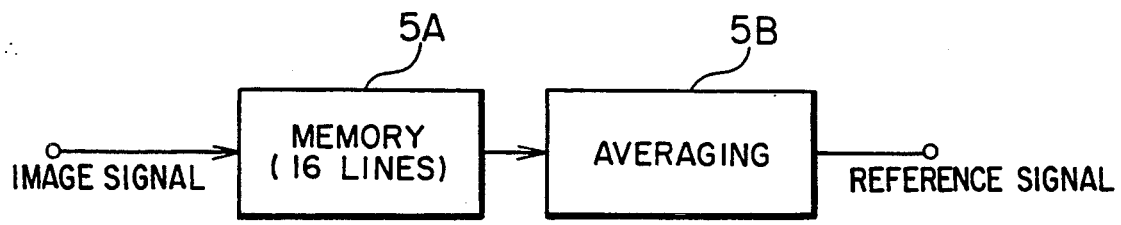
FIG. 7 is a schematic view of the shading correction circuit.

The shading correction circuits 5, 6, and 7 are the same in configuration. FIG. 7 illustrates the shading correction circuit 5. Said shading correction circuit comprises a memory 5A for 15 horizontal lines and an averaging circuit 5B for averaging 16 horizontal lines. The averaged white signal (a normalized signal) is used as a reference signal for the A-D converters 2, 3, and 4.

The shading-corrected digital image signal is supplied to a density conversion system.

In this example, adjustment density conversion circuits 15, 16, and 17 besides standard density conversion circuits 11, 12, and 13 are installed. Any of the density conversion circuits 11, 12, 13, 15, 16, and 17 may have a structure of ROM lookup table (LUT).

Figure 8:
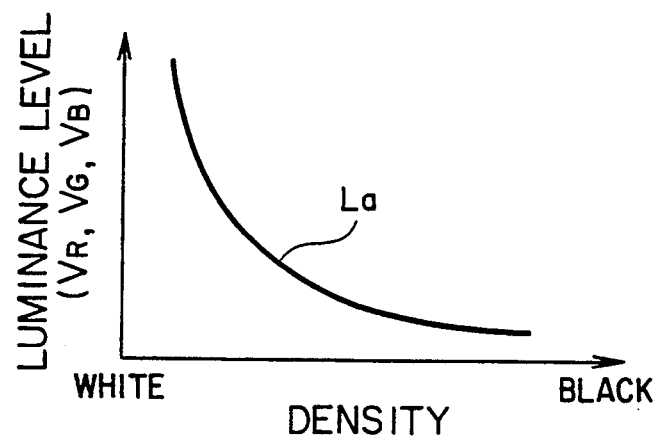
FIG. 8 is a characteristic diagram indicating the relationship between luminance level and density level.

The relationship between the image signal luminance level and the density is non-linear such as a curve La of FIG. 8. Density conversion is provided for correction of such non-linearity. Outputs of the standard density conversion circuits 11, 12, and 13 are supplied to the color code generating means 30.

Figure 9:
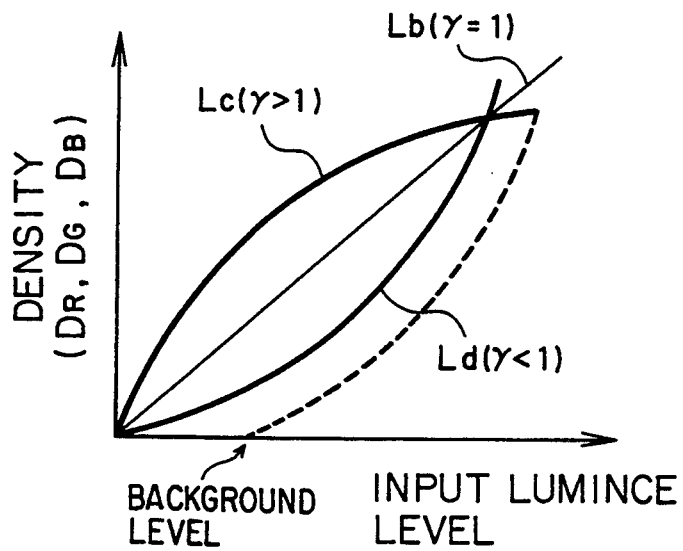
FIG. 9 is a characteristic diagram indicating the relationship between density and input luminance.

Desired gamma characteristics are selected by the adjustment density conversion circuits 15, 16, and 17, and desired color balance can be obtained from said gamma characteristics. Density data corresponding to a plurality of gamma characteristics such as curves Lb to Ld of FIG. 9 are stored, for example, in the adjustment density conversion circuits 15, 16, and 17 respectively. R, G, B manual selection signals are supplied to a density adjustment circuit 8 via a terminal 8a, and density selection signals (R, G, and B) for selecting the corresponding gamma characteristics are supplied to the adjustment density conversion circuits 15, 16, and 17 from the density adjustment circuit 8.

R, G, and B manual selection signals and a BK manual selection signal to be supplied from a terminal 8b as described later are set by an operation panel (not shown in the figure) mounted to the color copying machine.

In this example, R and G density signals are 6-bit long data and a B density signal is 5-bit long data.

As mentioned above, density conversion outputs DR, DG, and DB provided with predetermined gamma characteristics for color balance adjustment are used as image processing signals. Said outputs are supplied to the color image processing means 20 first.

By the color image processing means 20, the density signals of R, G, and B are subjected to the color separation processing for converting them to Y, M, C, and BK color density signals (6-bit data) so as to match the signals of the output system of the printer section 10C.

For that purpose, the color image processing means 20 is provided with dedicated converter ROMs 21, 22, 23, and 24 for Y, M, C, and BK, and the Y, M, C, and BK density signals are referred to by input density signals.

To convert R, G, and B density signals to Y, M, C, and BK density signals, a well-known conversion equation (for example, the linear masking method) can be used. However, this conversion equation allows a large error range which may cause a great difference between the reproduced color and the original color.

To improve such a disadvantage, especially to minimize a difference from the original color, the simulation results using a computer are stored in the color image processing means 20 in this example as density data.

An example of the data to be stored in said means is as follows.

To reproduce the color tone of a document, density data for minimizing the color difference using a color difference discrimination value ($\Delta E^*ab$ is used here) is generated in this example. An example of the generation procedure is as follows

I. COLOR CHART CREATION AND COLORIMETRIZATION

To check the output characteristics of the printer section 10C, create color charts. The printer section 10C in this example has a capability of outputting values of Y, M, C, and BK at 4 density levels. Since the digital copying apparatus in this example superposes toners, $4^4 = 256$ colors can be represented by the color toners.

Output the colors to the printer section 10C to obtain color charts. Put each obtained color chart on the document table of the scanner section 10A, and convert the color to 8-bit long lightness signals of R, G, and B by scanning. Convert the R, G, and B lightness signals to CIE XYZ coordinates and store them as data.

II. RGB-TO-XYZ CONVERSION MATRIX OPERATION

To convert the R, G, and B signals described in I to CIE XYZ coordinates, it is necessary to check the characteristics of the scanner section 10A. Select about 20 color charts from the Munsell color charts, and measure the colors by a colorimeter to determine values of the colors in the CIE XYZ coordinate system.

Next, put each color chart on the document table of the scanner section 10A and scan it to obtain R, G, and B lightness signals by the scanner section 10A.

The two types of values of the color charts determined in I and II correspond linearly to each other, hence the equation indicated below is held.

$$\begin{pmatrix} X \\ Y \\ Z \end{pmatrix} = \begin{pmatrix} a & b & c \\ d & e & f \\ g & h & i \end{pmatrix} \cdot \begin{pmatrix} R \\ G \\ B \end{pmatrix}$$

The parameters a, b, c, d, e, f, g, h, and i can be determined approximately from the above two types of values by the method of least squares, By determining the parameters a, b, c, d, e, f, g, h, and i, R, G, and B signals by the scanner section 10A can be converted to values in the XYZ color specification coordinate system, and the characteristics of the scanner section 10A can be checked.

III. DOT PATTERN GENERATION SIMULATION

The printer, as mentioned above, can indicate 256 colors per dot. For color reproduction, however, more colors are required to be indicated.

To solve this problem, this example uses a 4-level Dither method. By this method using three threshold matrixes with a size of 4×4 dots, integers 0 to 48 can be used as input signals, and 4-level signals with a size of 4×4 can be used as output.

It will require a great deal of labor to output such enormous reproducing colors to the printer and to colorimetrize all of them. Therefore, a simulation method with a computer is used for dot pattern generation and colorimetrization. A concrete example is indicated below.

This method is configured so as to use a large quantity of a black toner (a BK signal). In the case of color printing, superposition of Y, M, and C inks at one location means to color it black. The processing wherein the black component is replaced with a black ink so that the quantity of other chromatic color inks used is reduced is generally called UCA or UCR.

This example uses a method that, when color signals Y, M, and C are all higher than level 0, the signal levels of Y, M and C are uniformly lowered so that one of the Y, M, and C levels is reduced to 0 and the black level is raised instead for that much. The equation is as follows:

$$BK + P \times \min(C, M, Y) = BK'$$

$$C - BK \times S = C'$$

$$M - BK \times S = M'$$

$$Y - BK \times S = Y'$$

where "min ( )" is a function which takes the minimum value of the numerical values in parentheses and P is a parameter indicating the rate of BK toner replacement. S indicates a selector switch of UCA or UCR. S is 1 for UCR or 0 for UCA. In this example, P and S are set to 1 so as to realize 100% UCR.

In this example, BK is set to 0 so that BK' can be determined only from the black components of Y, M, and C. Therefore, the number of reproducing color types by the printer is reduced to $49^3$. However, this number is large enough as a number of colors to be reproduced, and will not affect color reproduction.

Next, color dot patterns of the number to the third power of 49 are generated as follows:

Firstly, one of Y, M, and C signal (between 0 and 48) is determined to be eliminated. When Y=30, M=20, and C=10, for example, they are converted to Y'=20, M'=10, C'=0, and BK'=10.

Figure 10:
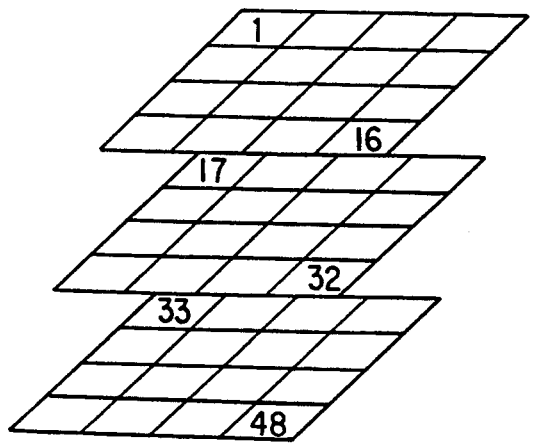
FIG. 10 is an illustration for the threshold matrixes.

These values of Y', M', C', and BK' are converted to multi-leveled (0, 1, 2, and 3) matrixes via the threshold matrixes shown in FIG. 10 respectively.

There are 3 threshold matrixes available. For example, numerals between 1 and 16 are arranged in the first matrix, between 17 and 32 in the second matrix, and between 33 and 48 in the third matrix. Assuming that the values of Y, M, and C just determined are the point in the upper left corner of the matrix, Y' is 2 because it is larger than a group of numbers between 1 and 17 but smaller than 33. In the same way, M' C', and BK' are 1, 0, and 1 respectively. These four multi-leveled matrixes of Y', M', C', and BK' are superposed as shown in FIG. 11 and a multi-leveled dot pattern is obtained.

The values of Y', M', C', and BK' in the same location correspond to the colors of the color charts created in I. Assuming that, for example, the values of Y', M', C', and BK' at the upper left of the matrix are as follows:

$$Y'=1, M'=2, C'=0, BK'=2$$

the colors of the color charts in I in which the yellow level is 1, the Magenta level is 2, the cyan level is 0, and the black level is 2 correspond to the location.

Since the colors of the color charts are converted to CIE XYZ values in I, a Dither matrix where those values are newly arranged is obtained.

FIG. 12 is an illustration for such a matrix. A reproduced color by the printer section 10C is represented as an average color of the range with a size of 4×4 dots as shown in FIG. 12. Therefore, assuming that the values of reproduced colors by the printer section 10C in the CIE XYZ coordinate system are X, Y, and Z, $$X = (1/16) \sum_{i=1}^{16} X_i$$

$$Y = (1/16) \sum_{i=1}^{16} Y_i$$

$$Z = (1/16) \sum_{i=1}^{16} Z_i$$

These values are under the condition that the dot size is kept constant during output. When the dot size depends on the result in I, the equations indicated below can be used.

$$X = (X_i \cdot S_i) / \sum_{i=1}^{16} S_i$$

$$Y = (Y_i \cdot S_i) / \sum_{i=1}^{16} S_i$$

$$Z = (Z_i \cdot S_i) / \sum_{i=1}^{16} S_i$$

where Si means an area of the dots.

By doing this, the average color of a small range, that is, the reproduced color by the printer section 10C can be calculated by the simulation level. By setting the C, M, and Y parameters independently between 0 and 48, $49^3$ reproducing colors can be calculated in the same way.

The document colors read by the scanner section 10A can be converted to CIE XYZ values according to II, and all the reproducing colors when the printer section 10C uses a 4-leveled Dither method with a matrix size of 4×4 can be obtained by CIE XYZ values according to III.

IV. COLOR MATCHING

A method that the data in II is related to that in III so as to keep the color tone of a document as much as possible and the relationship is determined as color tone reproduction information (reference density data) will be described hereunder.

This example starts when the lightness signals of a document read by the scanner section 10A are converted to density signals, then to 6-bit long digital signals for R and G or 5-bit long digital signals for B. Such signals are generated in all the cases (R, G=0 to 63, B=0 to 31) and the processing indicated below is performed each time.

The R, G, and B signals, which are converted to density signals, are converted to X, Y, and Z values according to II, and then to values in the uniform color space coordinate system. In this example, the signals are converted to values in the CIE.L*a*b* uniform color space. CIE.L*u*v* or LHC is also available.

The conversion equations to the CIE.L*a*b* uniform color space are as follows:

$$L^* = 116 (Y/Y_0) - 16$$

$$a^* = 500 [(X/X_0) - (Y/Y_0)]$$

$$b^* = 200 [(Y/Y_0) - (Z/Z_0)]$$

Next, select a color which is closest to the color represented by L*a*b* from the $49^3$ colors by the printer in III. In this case, the discrimination value representing the color similarity is important. However, the Euclid's distance in the uniform color space can be used as a discrimination value.

Signals to be compared with are displayed in the uniform color space because the uniform color space is advantageously designed so that the distance between two points in said uniform color space matches the color difference sensed by a human as much as possible.

A color closest to the color from the scanner section 10A is equivalent to the distance (color difference, ΔE*ab in the CIE.L*a*b* uniform color space) which is shortest. The relationship obtained from a calculation for selecting such a color from the colors reproduced by the printer section 10C (the relationship between the R, G, and B density signals from the scanner section 10A and the Y, M, C, and BK signals indicating the reproduced color by the printer) can be used.

By this method, when a color of a document is not within the toner color range, a color closest to such a color of the document can be selected and outputted as a set of density signals.

FIG. 13 is an illustration for such a color tone reproduction status.

Although, in this figure, the signals from the scanner section 10A exist outside the color reproduction range of the printer section 10C, a color whose ΔE*ab is smallest is selected as a reproduced color. Smallest ΔE*ab means a color which is most difficult to be discriminated.

Problems imposed by this method are that the computer processing time is extremely long and a large capacity memory for storing color tone reproduction processing information is required. For the former, the processing time can be reduced to several tens of minutes by a greater capability computer. The latter problem can be settled because the memory cost is going down.

The density signals created in this way are stored in the color image processing means 20. Monochromatic image processing means 25 is installed beside the color image processing means 20. The monochromatic image processing means 25 is supplied with G signals including contour information (image information) as lightness signals (image information), and those signals are converted to density data with 64 gradations in this example.

The monochromatic image processing means 25 is supplied with a black level density adjustment signal from the density adjustment circuit 8 mentioned above to control the black level and also with a background adjustment signal from an automatic density adjustment circuit (EE circuit) 27.

Therefore, a plurality of density data (for 64 gradations) corresponding to a plurality of gamma characteristics at different background levels are stored in the monochromatic image processing means 25.

The gamma characteristics are specified by the black level density adjustment signal and the background level is selected by the background adjustment signal. The gamma level adjustment is nothing else but the processing that the gamma characteristics are shifted in the lightness signal axis (input axis) (indicated by the alternate long and short dash line of FIG. 9).

The black level density adjustment signal is provided independently of a density adjustment signal for color balance adjustment so as to keep the black level unchanged when the color balance is adjusted.

The background level can also be adjusted by the monochromatic image processing so as to reproduce a clear image by removing the background portion from the gray portion of a document.

When the background is yellowish like an old newspaper, for example, a clearer image can be copied by removing the background. Therefore, the EE circuit 27 is supplied with an output signal from the monochromatic image processing means 25 as density information and also with color code data ("00" indicating an achromatic color described later or "11") so as to perform the background level adjustment (automatic density adjustment) only for an achromatic image.

Whether or not to use the EE circuit 27 is controlled by the presence or absence of an EE select signal (manually selected) to be supplied to the terminal 28. The apparatus can be structured so that the automatic adjustment of the background level is inhibited when a black level density adjustment signal is manually selected.

A density signal (for convenience' sake, the same symbols as that of color signals Y, M, C, and BK are used) outputted from the color image processing means 20 and a monochromatic color density signal MONO outputted from the monochromatic image processing means 25 are supplied to the selector 32. For a color image, the density signal outputted from the color image processing means 20 is selected, while for an achromatic image, the density signal outputted from the monochromatic image processing means 25 is selected.

To realize such processing, color code generating means 30 is provided. The color code generating means 30 is supplied with R, G, and B density signals from the standard density conversion circuits 11, 12 and 13, and a color code (2 bits long) corresponding to the chromatic or achromatic image information according to a combination of the densities is outputted. Therefore, it is recommended that the color code generating means 30 comprises ROMs.

Figures 14, 15:
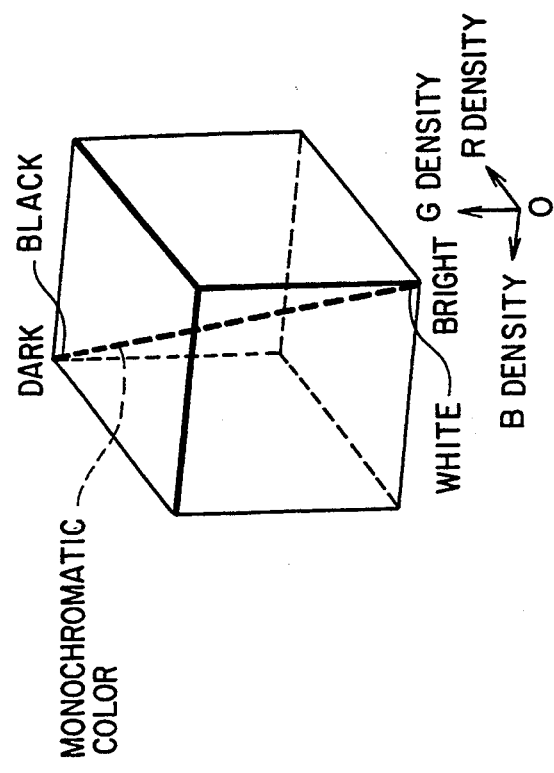
FIG. 14 is an illustration for the color code generation status.
FIG. 15 shows the relationship between color code and density output.

FIG. 14 is an illustration for the relationship between the densities of the three primary colors R, G, and B encoded by the reading means CCD and the color code processing. In this figure, the three sides of the cube on this side indicate the densities of R, G, and B. Therefore, the point where the densities of R, G, and B are 0 is white, and the point where the densities of R, G, and B are the maximum values is black. The range of the dotted line between the white and black points of the cube is an achromatic range. The range except the white, black, and achromatic range is discriminated as a color (chromatic) range. A color code for discriminating white, black, or color can be generated in this way.

FIG. 15 shows the relationship between a color code and a density signal selected by said color. In this example, either three colors of Y, M, and C or four colors of Y, M, C, and BK can be selected for the same color image. In the example of FIG. 14, for convenience' sake, the four colors of Y, M, C, and BK and the color codes relating to a monochromatic image are provided.

The selected 6-bit density signal and color code are supplied to the color ghost correction circuit 40.

Chromatic colors such as red and yellow appear around a black character, and black appears around a chromatic color. The color ghost correction circuit is provided so as to remove such ghosts.

The correction of a color ghost can be performed only for the color code thereof. Color ghost detecting means 41 and 42 detect color ghosts in the main scanning direction (the horizontal scanning direction) and in the sub-scanning direction (the drum rotating direction) respectively. Color code data of 7 pixels is used for detecting color ghosts in the main scanning direction, and color code data of 7 lines by one pixel for detecting color ghosts in the sub-scanning direction.

The color code of a color ghost generated is converted to a color ghost detecting code (for example, 01) and then corrected to normal color ghost data by the color ghost correction section 45 located at the next stage, that is, the color code data (01) of the color ghost generated is corrected to a color code data (10).

A memory 43 is a delay circuit for the density signal which allows the time axis of the color code delayed due to detection of the color ghost to match that of the density signal. In this example, the memory 43 comprises 7 lines by 7 pixels.

The color code of the corrected color ghost is supplied to the color document/monochromatic document, that is, color image/monochromatic image discriminating means 47, and the discrimination output is supplied to the CPU installed in the main unit of the apparatus, and then the image forming process corresponding to the color image or monochromatic image is selected by the CPU.

This means that the optical scanning count of the scanner section 10A and the number of revolutions of the image forming unit 80 installed in the printer section 10C are designated by the color of the color image according to the discrimination output.

The discrimination output can be generated by the discrimination means 47 as follows:

Firstly, the document 82 is prescanned before starting the regular scanning to create histograms of the R, G, and B density signals. Next, as shown in FIG. 16, the discrimination means discriminates whether the image information is on a color image (chromatic) or a monochromatic image (achromatic, white) for each picture element from the relationship between the total frequency of color code data indicating chromatic colors and the total frequency of color code data (00, 11) indicating an achromatic color. The image forming process is decided on the basis of the discrimination output thereof.

When a document is only red, for example, the red is reproduced by three image forming processes of Y, M, and C. In this case, therefore, the optical scanning count and the number of revolutions (scanning count) of the image forming unit 80 can be set to 3 respectively.

FIG. 17 shows the relationship between a chromatic color or an achromatic color and the discriminated result thereof.

The density signal outputted from the color ghost correction circuit 40 is filtered by the filtering circuit 50 according to the image contents.

In the case of a character image, for example, the resolution thereof (for example, MTF) is improved by the filtering process. In the case of a picture image, said image is smoothed by the filtering process.

This filtering process can be realized, for example, by a 3×3 convolution filter. FIG. 17 shows an example thereof.

In FIG. 17, cross filters are used. FIG. 18A shows a resolution correction filter and FIG. 18B a smoothing filter. The filter to be used is designated by an external signal. This designation signal can be generated automatically.

The numerical values shown in FIG. 18 are filter factors which are an example.

MTF is calculated from the following equation using the level y of a white signal and the level x of a black signal.

$$MTF = (y-x/y+x) \times 100(\%)$$

The filtered density signal is enlarged or contracted (variable magnification) by the variable magnification circuit 52.

The variable magnification processing in the main scanning direction is performed by interpolating the density signal data (partial interpolation included), and the variable magnification processing in the sub-scanning direction by controlling the moving speed of the scanner section 10A.

The variable-magnified density signal is halftoned by the halftoning circuit 54.

The halftoning processing comprises halftoning of the outside of the image information, for example, as shown in FIG. 19A and half toning of the inside of the image information outline as shown in FIG. 19B.

In the half toning processing shown in FIG. 19A, the halftoning data is outputted within the designated range, and the OR output of said data and the density signal is used as a signal after half toning.

In the halftoning processing in FIG. 19B, the processing in FIG. 19A is performed for the outlined image density signal.

For halftoning, an undulated waveform or a stripe waveform can be used instead of dots.

The halftoned density signal is supplied to the PWM modulation circuit 60 for PWM modulation.

The PWM modulation includes multi-level processing such as 3-level or 4-level. The PWM modulation is used for reproducing the gradation of a picture image or the resolution of a character image.

In this case, there is no problem imposed by the PWM modulation for the resolution for each picture element. Various experiments show, however, that the PWM modulation for gradation reproduction for each picture element causes density variations, and hence no satisfactory gradation can be obtained. In this example, therefore, the PWM modulation is preset for each two picture elements.

FIG. 20 shows an example of the PWM modulation circuit 60. A density signal supplied to the terminal 61 is supplied to the D/A converter 62 so as to be converted to an analog signal, and said analog density signal is supplied to the modulation section 63.

Figure 21:
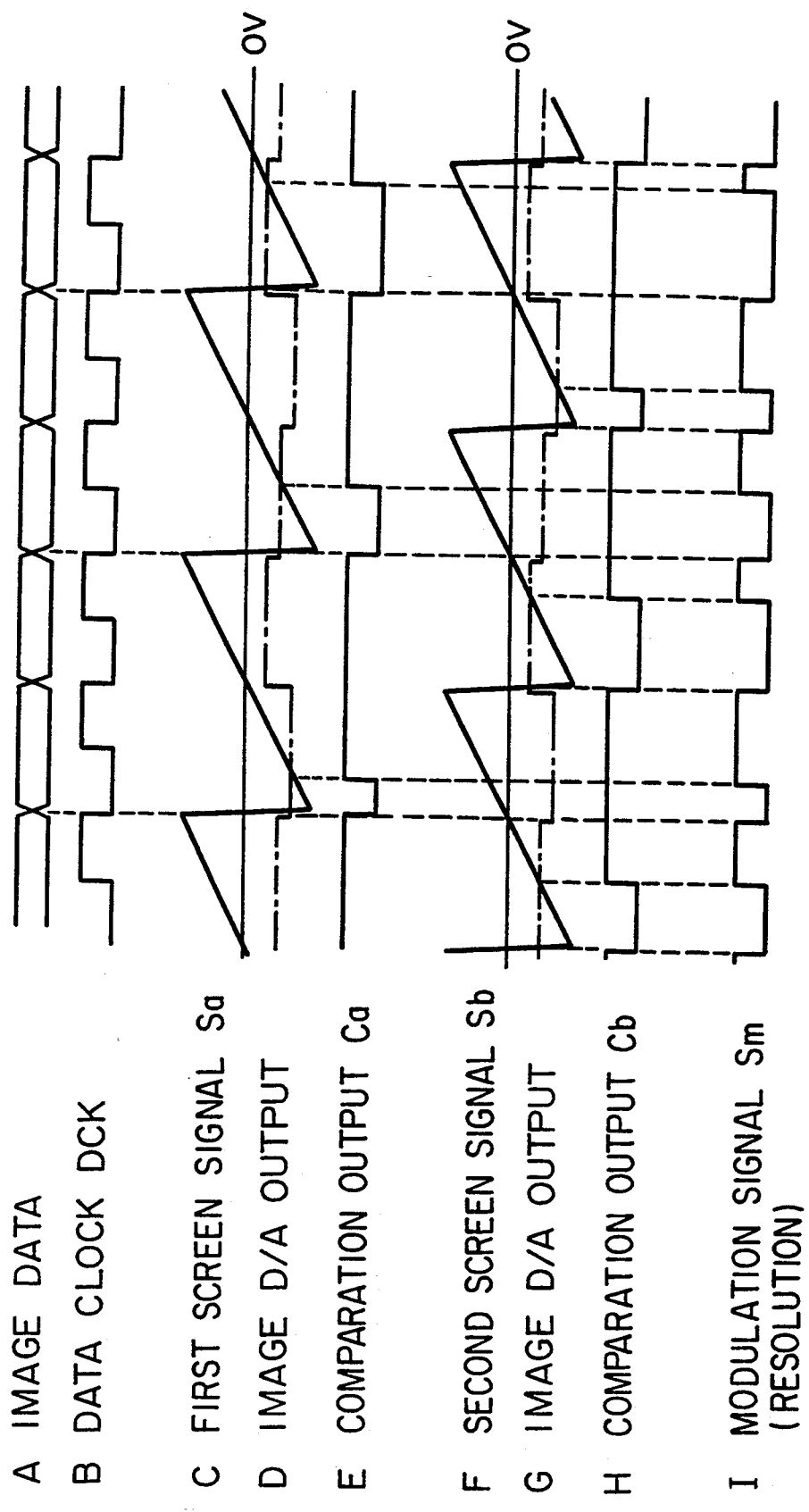
FIGS. 21 and 22 are waveform diagrams for explaining operations of said modulation circuit.
Figure 22:
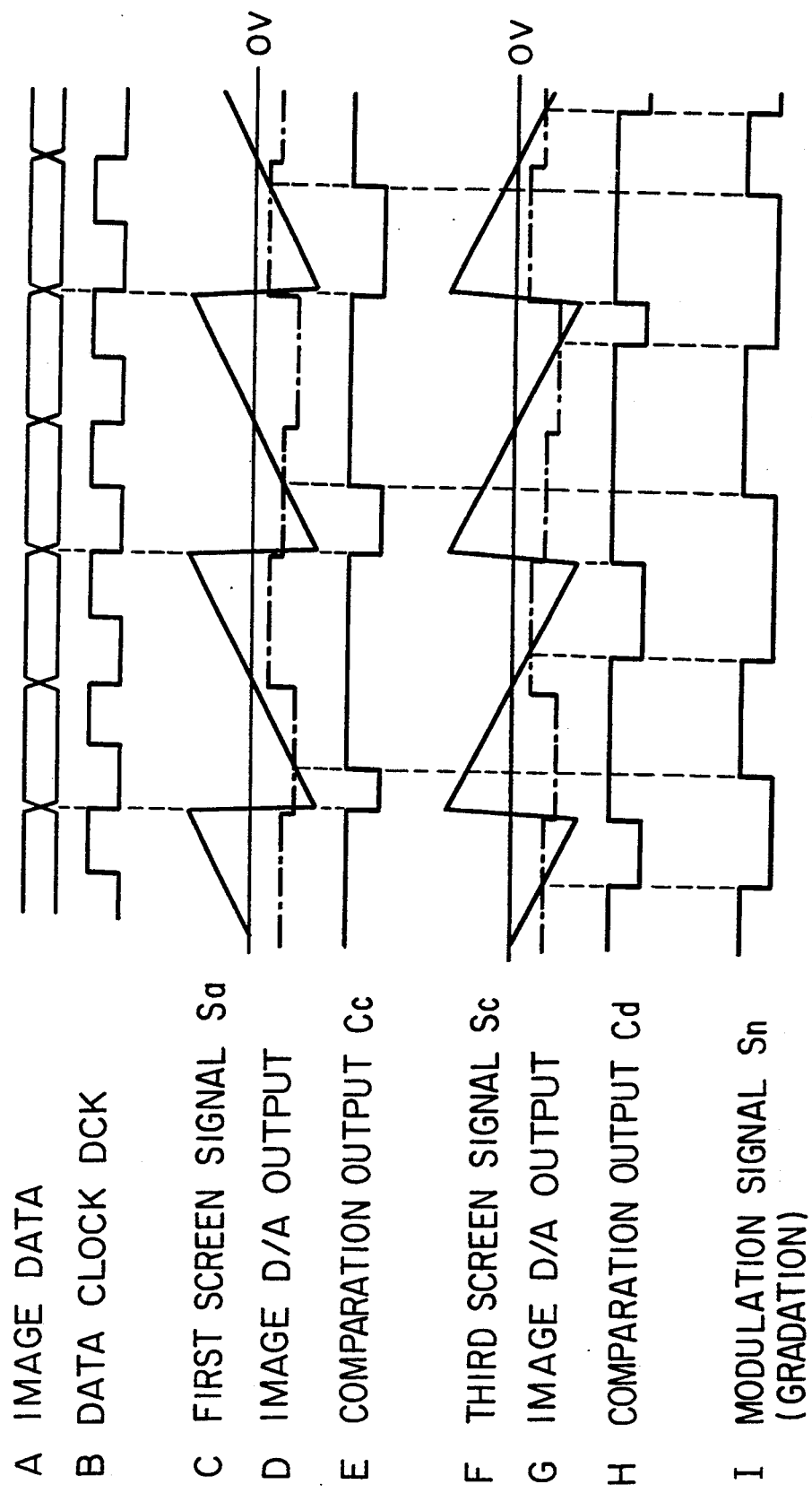

Screen signal generating means 65 for generating three screen signals Sa, Sb, and Sc shown in FIGS. 21 and 22 is provided.

The screen signals Sa, Sb, and Sc are equal in waveform to each other but different in phase from each other. On the basis of the 1st screen signal Sa, the 2nd screen signal Sb differs in phase by 90° from the 1st screen signal, and the 3rd screen signal Sc by 180°.

The three screen signals Sa, Sb, and Sc are supplied to the modulation section 63. The 1st and 2nd screen signals Sa and Sb perform the modulation attaching importance to the resolution, and the 1st and 3rd screen signals Sa and Sc the modulation attaching importance to the gradation.

Firstly, the former will be described hereunder. The 1st and 2nd screen signals which are used as resolution screen signals perform a comparison with an analog density signal (an image D/A output: D or G of FIG. 21) in level. As a result, the 1st screen signal Sa and the density signal generate a comparison output Ca shown in E of FIG. 21. In the same way, the 2nd screen signal Sb and the density signal generate the second comparison output Cb shown in H of FIG. 21.

When both outputs are processed by AND, a modulation output Sm shown in I of FIG. 21 is obtained. This is equivalent to a level comparison of the analog density signal by a screen signal whose period is half of the period of the 1st screen signal Sa.

The above screen signal with a half period is equal in period to a data clock signal DCK (B of FIG. 21), hence the modulation signal Sm which is PWM-modulated for each dot (picture element) is obtained. A of FIG. 21 indicates a digital density signal (image data).

The modulation when importance is attached to the gradation is as follows:

The 1st screen signal Sa used as a gradation screen signal and an analog density signal generate the 3rd comparison output Cc (E of FIG. 22). The 3rd screen signal Sc and the density signal generate the 4th comparison output Cd (H of FIG. 22).

When the comparison outputs Cc and Cd are ANDed, a modulation signal Sn shown in I of FIG. 22 is obtained.

The 3rd screen signal Sc is reversed in phase to the 1st screen signal but obtained in the same timing as the 1st screen signal. When the comparison outputs Cc and Cd are ANDed, therefore, analog image signals are compared in level at an interval of about one period of the 1st screen signal Sa.

This means that the level comparison is performed at an interval of a period two times of that of the data clock signal DCK. When analog image signals are PWM-modulated in an interval of two dots, the gradation close to that of an input image can be reproduced.

One of the modulation signals Sm and Sn is selected by the selector 67, and the selected modulation signal Sm or Sn is supplied to the printer section 10C.

The selector 67 is externally controlled manually or automatically. In the case of manual control, the selector is fixed to the picture image or character image mode which is externally set. In the case of automatic control, the mode is selected according to the image information of a document. In the case of automatic control, therefore, the above color code can be used as a selection signal.

As mentioned above, the apparatus of the present invention discriminates whether a document is monochromatic or chromatic on the basis of the information for discriminating white, an achromatic color, or a chromatic color, which is provided for each picture element and controls the image forming process by the discrimination.

By doing this, whether a document is monochromatic or chromatic can be discriminated by using output from the color code generating means installed in the color conversion processing system of the image processing section 10B. Therefore, the apparatus is characterized in that the configuration of the monochromatic document or color document discriminating means can be simplified.

Therefore, the color image processing apparatus of the present invention, as mentioned above, is extremely suited for a digital color copying apparatus.

Figure 23:
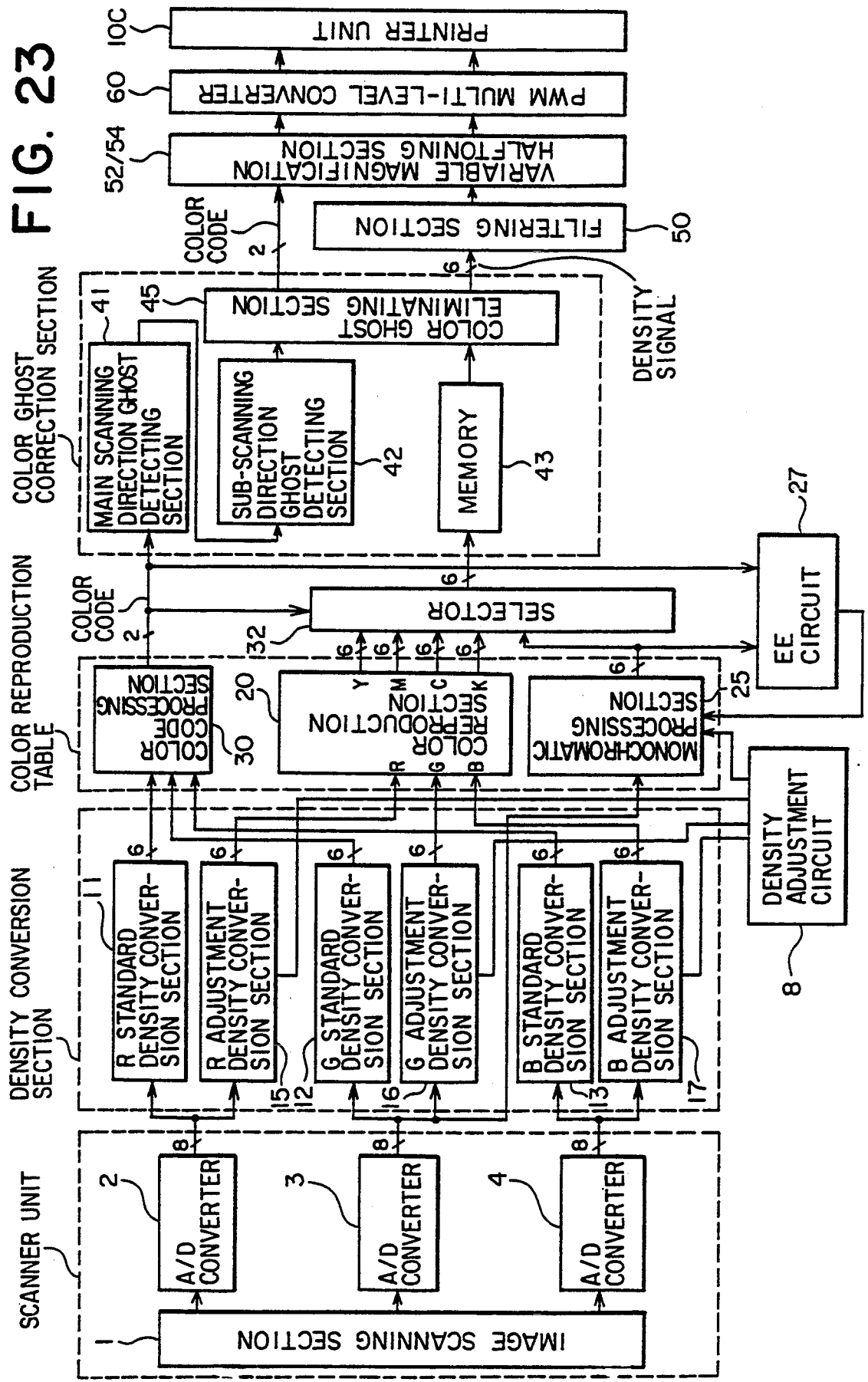
FIG. 23 is a block diagram indicating the configuration for explaining the density conversion section.
Figure 24:
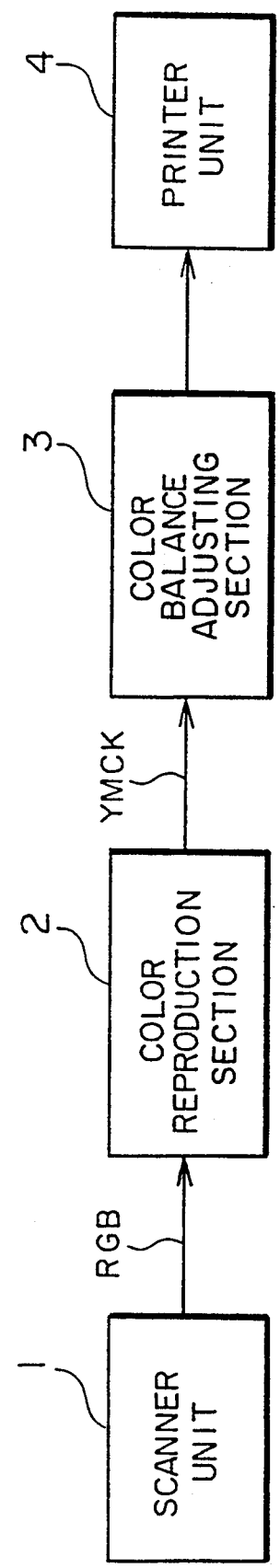
FIG. 24 is a schematic view of a conventional color image processing apparatus.

Next, the density conversion section and others of the present invention will be described hereunder with reference to FIG. 23. The color code processing section 30 for generating color codes is supplied with 6-bit data from the R standard density conversion section 11, G standard density conversion section 12, or B standard density conversion section 13. The levels of these data will not be changed by changing the color balance. Therefore, color codes generated by the color code processing section 30 will be not changed by changing the color balance. Accordingly, even if the color tone of an image is changed by changing the color balance, the color code of the black portion of the read image, which is a black color code, is left unchanged. When black characters are found in the read document, therefore, the monochromatic data from the monochromatic processing section 25 is selected by the selector 32, and said monochromatic data is outputted unchanged as black data. By doing this, any black character portion (an achromatic range) is not colored.

The above description is in a mode where an image containing black characters is copied [4-color (full color) normal mode]. In a mode where a picture is copied [4-color (full color) picture mode], it is desirable to allow only Y, M, C, and BK of the output from the color reproduction section 20 to pass through the selector 32. In this case, the color balance of Y, M, C, and BK is changed because the color reproduction section 20 is supplied with signals which are adjusted in density. The black portion is naturally colored. This is because, in the case of a picture image, no problems are caused by changed colors according to the color balance adjustment unlike the black character portion. Therefore, the color code processing section 30 is designed to generate no color codes in a mode other than the 4-color (full color) normal mode.

Since the color ghost correction section detects a color ghost on the basis of the color code, no color ghost is corrected in a mode where no color code is generated [4-color (full color) picture mode, monochromatic mode]. In other than the 4-color (full color) normal mode, there is no need to correct color ghosts and no problems are caused.

As mentioned above, separately from the adjustment density conversion section which is affected by the color balance adjustment, a standard density conversion section which is not affected by the color balance adjustment is installed so that the color code processing can be accurately performed. By doing this, the color tone of black characters is not changed when the color balance adjustment is performed.

In the apparatus of the present invention, as mentioned above, R, G, and B signals are adjusted in color balance before converted to Y, M, C, and BK signals. Since R, G, and B data correspond linearly to the R, G, and B densities of a document image, the color balance adjustment affects straight the output color, and the color balance adjustment operation well corresponds to a change in the output color. Unlike the adjustment in the state of Y, M, C, and BK, the output color is not affected by complex gradation characteristics of the printer. Consequently, the color balance adjustment can be easily performed.

What is claimed is:

1. An image processing apparatus for processing a digital color image signal representing an image made up of pixels, comprising:
   means for scanning the image to generate a plurality of digital color component image signals for each pixel;
   means for dividing said plurality of digital color component image signals of each pixel into at least two group signals;
   first processing means for processing one of said two group signals to generate a color code signal for each pixel with which said image is discriminated as one of a color image and a monochromatic image;
   means for generating a color balance adjusting signal; and
   second processing means, disposed in parallel to said first processing means, for processing another of said two group signals to generate a plurality of image reproducing signals for each pixel, said second processing means including means for modifying the color balance between a plurality of color components of a reproduced image on the basis of said color balance adjusting signal.

2. The image processing apparatus of claim 1, wherein said color code signal identifies said image as one of achromatic or chromatic.

3. The image processing apparatus of claim 1, wherein said second processing means includes means for adjusting color balance.

4. An apparatus for reproducing a color image, comprising:
   means for generating a color balance adjusting signal, said adjusting signal being capable of being manually adjusted by an operator of the apparatus;
   means for processing a plurality of first color signals on the basis of said color balance adjusting signal, each of said first color signals corresponding to a different primary color;
   means for converting an output of said processing means into a plurality of second color signals; and
   means for reproducing a color image with a plurality of color toners of different colors, each of said color toners corresponding to one of said second color signals.

5. The apparatus of claim 4, wherein the plurality of first color signals include a signal representing red color, a signal representing green color, and a signal representing blue color.

6. The apparatus of claim 4, wherein the plurality of color toners include a cyan toner, a magenta toner, and a yellow toner.

7. The apparatus of claim 6, wherein the plurality of color toners further include a black toner.

8. The apparatus of claim 4, further comprising:
   means for processing said first color signals to generate a color code signal;
   means for processing at least one of the plurality of first color signals to generate a monochromatic image signal; and
   means for selecting one of said second color signals and said monochromatic image signal on the basis of said color code signal.

9. An image processing apparatus comprising:
   means for reading an original document to generate a series of image signals, each of said image signals corresponding to a pixel of said original document;
   color code generating means for a processing said image signals to generate a color code identifying said image signals as chromatic or achromatic;
   second process means, disposed in parallel to said color code generating means, for processing said image signals to generate a color image reproducing signal;
   third process means, disposed in parallel to said color code generating means and said second process means, for processing at least one of said image signals to generate a monochromatic image reproducing signal; and
   selecting means for selecting either said color image reproducing signal or said monochromatic image reproducing signal on the basis of said color code.

10. An image reproducing apparatus comprising:
   means for reading an original document to generate a series of image signals, each of said image signals corresponding to a pixel of said original document;
   color code generating means for processing said image signals to generate a color code identifying said pixel as chromatic or achromatic;
   second process means for generating a first image reproducing signal in accordance with said image signals, said first image reproducing signal being related to a chromatic image;
   third process means for generating a second image reproducing signal in accordance with at least one of said image signals, said second image reproducing signal being related to a monochromatic image; and
   selecting means for selecting either said first image reproducing signal or said second image reproducing signal on the basis of said color code.

* * * * *

UNITED STATES PATENT AND TRADEMARK OFFICE
CERTIFICATE OF CORRECTION

PATENT NO. : 5,357,354
DATED : October 18, 1994
INVENTOR(S) : Masahiko MATSUNAWA et al.

It is certified that error appears in the above-indentified patent and that said Letters Patent is hereby corrected as shown below:

Claim 9, column 18, line 33 delete "a".

Signed and Sealed this

Second Day of May, 1995

Attest:

BRUCE LEHMAN

Attesting Officer    Commissioner of Patents and Trademarks